United States Patent
Civanlar et al.

(10) Patent No.: US 8,341,672 B2
(45) Date of Patent: Dec. 25, 2012

(54) SYSTEMS, METHODS AND COMPUTER READABLE MEDIA FOR INSTANT MULTI-CHANNEL VIDEO CONTENT BROWSING IN DIGITAL VIDEO DISTRIBUTION SYSTEMS

(75) Inventors: Mehmet Reha Civanlar, Istanbul (TR); Ofer Shapiro, Fair Lawn, NJ (US); Tal Shalom, Fair Lawn, NJ (US)

(73) Assignee: Delta Vidyo, Inc, Hackensack, NJ (US)

( * ) Notice: Subject to any disclaimer, the term of this patent is extended or adjusted under 35 U.S.C. 154(b) by 350 days.

(21) Appl. No.: 12/765,767

(22) Filed: Apr. 22, 2010

(65) Prior Publication Data

US 2010/0275229 A1 Oct. 28, 2010

Related U.S. Application Data

(60) Provisional application No. 61/172,355, filed on Apr. 24, 2009.

(51) Int. Cl.
*H04N 5/445* (2011.01)
*H04N 7/173* (2011.01)
*H04N 7/12* (2006.01)
*G06F 3/00* (2006.01)

(52) U.S. Cl. ............... 725/43; 348/564; 348/565
(58) Field of Classification Search ............ 725/112, 725/113, 43; 348/564, 565
See application file for complete search history.

(56) References Cited

U.S. PATENT DOCUMENTS

| 5,555,244 A | 9/1996 | Gupta et al. |
| 6,055,012 A | 4/2000 | Haskell et al. |
| 6,167,084 A | 12/2000 | Wang et al. |
| 6,275,531 B1 | 8/2001 | Li |
| 6,292,512 B1 | 9/2001 | Radha et al. |
| 6,496,217 B1 | 12/2002 | Piotrowski |
| 6,498,865 B1 | 12/2002 | Brailean et al. |
| 6,510,553 B1 * | 1/2003 | Hazra ............... 725/87 |
| 6,643,496 B1 | 11/2003 | Shimoyama et al. |
| 6,912,584 B2 | 6/2005 | Wang et al. |
| 6,973,622 B1 | 12/2005 | Rappaport et al. |
| 7,012,893 B2 | 3/2006 | Bahadiroglu |

(Continued)

FOREIGN PATENT DOCUMENTS

EP 1 713 280 10/2006

(Continued)

OTHER PUBLICATIONS

U.S. Appl. No. 12/765,793, filed Jul. 10, 2012 Non-Final Office Action.

(Continued)

*Primary Examiner* — Pankaj Kumar
*Assistant Examiner* — Reuben M Brown
(74) *Attorney, Agent, or Firm* — Baker Botts L.L.P.

(57) ABSTRACT

Disclosed are a method, apparatus, system, and computer readable media containing instructions for preparing and displaying a plurality of audio-visual signals in a digital video distribution system (e.g., IPTV), which enables fast channel switching between channels. The system includes a server which sends a plurality of audio-visual signals coded in a base layer and enhancement layer format to an endpoint. The endpoint receives and decodes the base layer of a first channel, at least one second base layer of a second channel, and at least one enhancement layer of the first channel, and displays them on a video display.

4 Claims, 8 Drawing Sheets

U.S. PATENT DOCUMENTS

| | | | |
|---|---|---|---|
| 2002/0129374 A1* | 9/2002 | Freeman et al. | 725/91 |
| 2002/0136162 A1 | 9/2002 | Yoshimura et al. | |
| 2002/0163918 A1 | 11/2002 | Cline | |
| 2003/0074674 A1 | 4/2003 | Magliaro et al. | |
| 2003/0135631 A1 | 7/2003 | Li et al. | |
| 2004/0001479 A1 | 1/2004 | Pounds et al. | |
| 2004/0031058 A1 | 2/2004 | Reisman | |
| 2004/0042549 A1 | 3/2004 | Huang et al. | |
| 2004/0071354 A1 | 4/2004 | Adachi et al. | |
| 2004/0218816 A1 | 11/2004 | Hannuksela | |
| 2005/0135477 A1 | 6/2005 | Zhang et al. | |
| 2005/0147164 A1 | 7/2005 | Wu et al. | |
| 2005/0254575 A1 | 11/2005 | Hannuksela | |
| 2005/0265450 A1 | 12/2005 | Raveendran et al. | |
| 2005/0275752 A1* | 12/2005 | Li et al. | 348/398.1 |
| 2006/0015637 A1 | 1/2006 | Chung | |
| 2006/0184966 A1 | 8/2006 | Hunleth et al. | |
| 2007/0003222 A1 | 1/2007 | Shingai | |
| 2007/0073779 A1 | 3/2007 | Walker et al. | |
| 2007/0121584 A1 | 5/2007 | Qiu et al. | |
| 2007/0195203 A1 | 8/2007 | Walker et al. | |
| 2008/0168523 A1 | 7/2008 | Ansari et al. | |
| 2008/0273079 A1 | 11/2008 | Campbell et al. | |
| 2009/0021592 A1 | 1/2009 | Oyama et al. | |
| 2009/0025028 A1 | 1/2009 | Cassanova et al. | |
| 2009/0185618 A1* | 7/2009 | Liu et al. | 375/240.01 |
| 2009/0187960 A1 | 7/2009 | Lee et al. | |
| 2010/0161716 A1 | 6/2010 | Kajos et al. | |
| 2010/0272187 A1 | 10/2010 | Civanlar et al. | |
| 2010/0275229 A1* | 10/2010 | Civanlar et al. | 725/39 |
| 2010/0293584 A1 | 11/2010 | Civanlar et al. | |

FOREIGN PATENT DOCUMENTS

WO  WO 2004/036916 A1  4/2004

OTHER PUBLICATIONS

Cees G.M. Snoek and Marcel Worring, "Multimodal Video Indexing: A Review of the State-of-the-art," Multimedia Tools and Applications, vol. 25, No. 1/Jan. 2005, Springer.

Michael A. Smith "Video Skimming and Chracterization through the Combination of image and language Understanding Techniques," p. 775, 1997 IEEE Computer Society Conference on Computer Vision and Pattern Recognition (CVPR '97), 1997.

S. Wenger, "Video Redundancy Coding in H.263+", Workshop on Audio-Visual Services for packet networks (aka Packet Video Workshop), 1997, 6 pages.

(ITU-T H.264) "ITU-T Recommendation H.264: Advanced Video Coding for Generic Audiovisual Services"in: International Relecommunication Union (On Line, {URL: http://www.itu.int/rec/T-Rec-H.264/en}Mar. 1, 2005 entire document.

RTSP, RFC2326, available at http://www.rfc-editor.org/rfc/rfc2326.txt.

RTP, RFC3550, available at http://www.rfc-editor.org/rfc/rfc3550.txt.

RFC3170, http://www.rfc-editor.org/rfc/rfc3170.txt.

U.S. Appl. No. 12/765,815, filed Apr. 22, 2010.
U.S. Appl. No. 12/765,793, filed Apr. 22, 2010.
U.S. Appl. No. 12/015,956, filed Jan. 17, 2008.
U.S. Appl. No. 11/608,776, filed Dec. 8, 2006.
U.S. Appl. No. 11/682,263, filed Mar. 5, 2007.
U.S. Appl. No. 12/015,945, filed Jul. 3, 2008.
U.S. Appl. No. 12/821,782, filed Jun. 23, 2010.
U.S. Appl. No. 12/943,622, filed Nov. 10, 2010.
Extended European Search Report for EP 10767793.2, dated Oct. 1, 2012 (corresponds to U.S. Appl. No. 12/765,767).

* cited by examiner

SYSTEMS, METHODS AND COMPUTER READABLE MEDIA FOR INSTANT MULTI-CHANNEL VIDEO CONTENT BROWSING IN DIGITAL VIDEO DISTRIBUTION SYSTEMS

CROSS-REFERENCE TO RELATED APPLICATIONS

This application claims the benefit of priority to U.S. Provisional Application Ser. No. 61/172,355, filed Apr. 24, 2009, which is hereby incorporated by reference herein in its entirety.

BACKGROUND

1. Technical Field

The disclosed invention relates to compressed digital video distribution systems such as cable television (CATV), satellite television, Internet protocol television (IPTV) and Internet-based video distribution systems. In particular, it relates to digital video distribution systems to enable fast browsing of video content of multiple TV channels or video files while simultaneously watching one or more selected TV channels or video files. It is also concerned with the technology used in the endpoints of a digital video distribution system, such as a set-top-box or game console.

2. Background Art

Subject matter related to the present application can be found in co-pending U.S. patent application Ser. Nos. 12/015,956, filed Jan. 17, 2008 and entitled "System And Method For Scalable And Low-Delay Videoconferencing Using Scalable Video Coding," 11/608,776, filed Dec. 8, 2006 and entitled "Systems And Methods For Error Resilience And Random Access In Video Communication Systems," and 11/682,263, filed Mar. 5, 2007 and entitled "System And Method For Providing Error Resilience, Random Access And Rate Control In Scalable Video Communications," and U.S. Pat. No. 7,593,032, filed Jan. 17, 2008 and entitled "System And Method For A Conference Server Architecture For Low Delay And Distributed Conferencing Applications," each of which is hereby incorporated by reference herein in their entireties.

Traditionally, TV programs are often carried over CATV networks. CATV is one of the most popular broadband digital cable networks in Europe, Australia, America, and Asia. With a CATV system, many video channels are multiplexed on a single cable medium with very high bandwidth and distributed through dispersed cable head-end offices that serve a geographical area. The cable head-end of the CATV infrastructure simultaneously carries the digitized and encoded video of each and every channel, regardless of whether the user watches a channel or not.

Recently, IPTV, which transmits TV programs over packet networks, has gained significant momentum due to its advantage in delivering new services with ease. One of the drawbacks of IPTV is the relatively narrow bandwidth of the user's access line. For example, a user's access line may be a telephone line employing asymmetric digital subscriber line (ADSL) or similar technologies, which have limited bandwidth available to deliver high quality video content. Sending a large number of programs at the same time is not practical in an IPTV system due to the aforementioned lack of bandwidth. Furthermore, given the vast amount of video material available over the Internet, it is practically impossible to deliver all video content of interest to the user simultaneously. In addition, IPTV may rely on public Internet or a private IP network, which may have notable transport delays. In addition, while the CATV infrastructure is designed for broadcast TV systems, video on demand (VoD) and pay per view (PPV) services, which require a unicast transmission to a user's TV for "personalized TV" services, are ideally fit for IPTV.

Endpoints designed for video conferencing have been disclosed, amongst other things, in co-pending U.S. patent application Ser. No. 12/015,956, incorporated herein by reference. Video distribution, e.g., IPTV, endpoints share many commonalities with video conferencing endpoints relevant to this invention.

Figure 1:
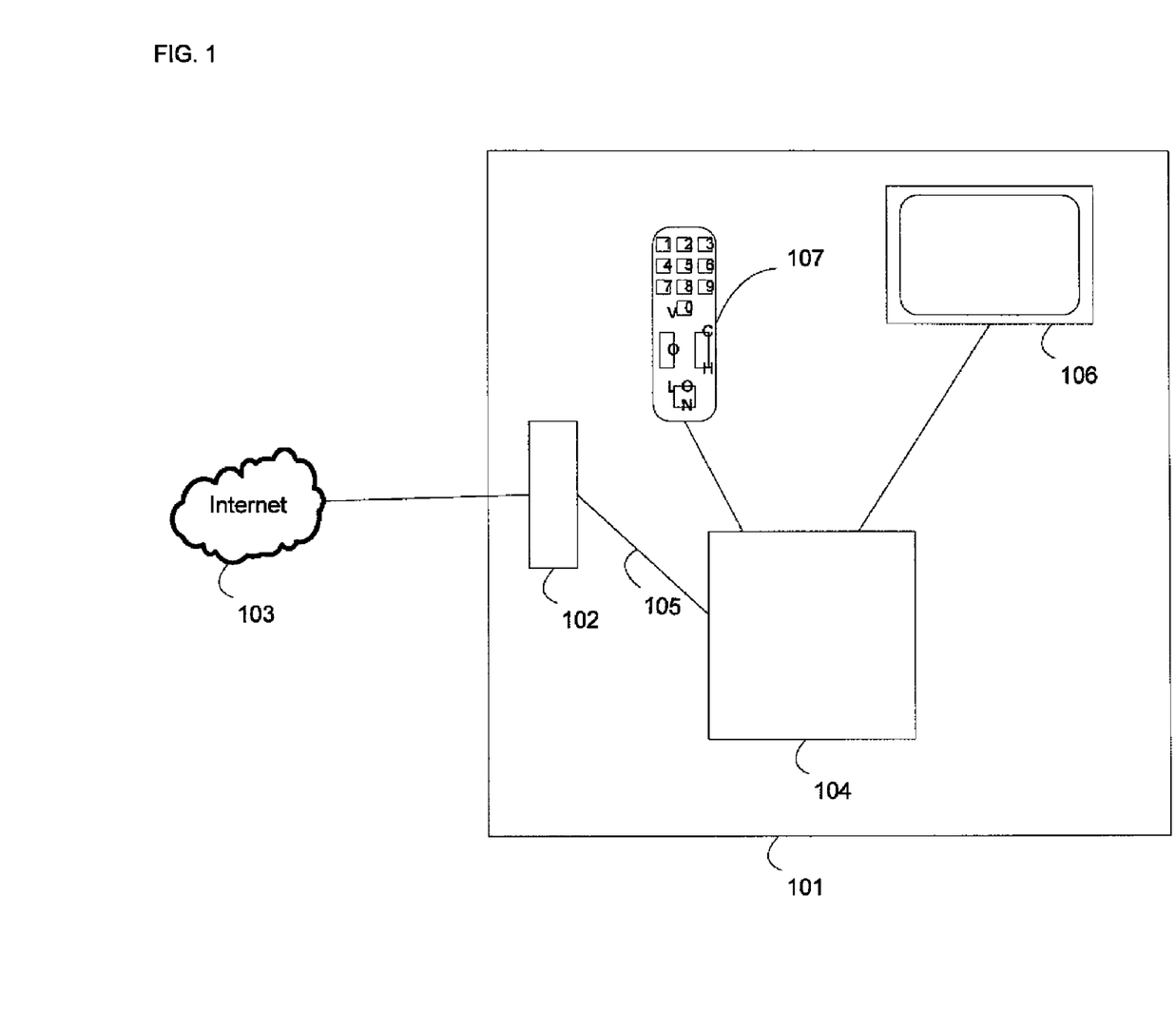
FIG. 1 is a block diagram illustrating an exemplary endpoint in accordance with the present invention.

Referring to FIG. 1, a typical endpoint (101) includes a set of devices and/or software that is located at the user's premises. One typical endpoint includes a network interface (102) (for example, a DSL modem, a cable modem, or an ISDN T1 interface) connected to a network (103) (for example, the Internet or another private or public IP network), a computer (104) (for example, a set-top box, game console, personal computer or another type of computer) that connects via a local area network (105) (for example, Ethernet) to the network interface (102), a video display (106) (for example, a TV or computer monitor), and an audio output (for example, a set of loudspeakers). The set-top-box translates the data received from the Internet into a signal format the TV understands; traditionally, a combination of analog audio and video signals are used, but recently all digital interfaces (such as HDMI) have become common. The set-top-box therefore typically includes analog or digital audio/video outputs and interfaces. Both TV monitor and set-top-box device are typically controlled by an input device (107), alternatively known as a pointing device (for example, a remote control, computer mouse, keyboard, or another input device). However, most prior art set-top-boxes lack media input devices, such as camera or microphone, that are common to videoconference endpoints.

Figure 2:
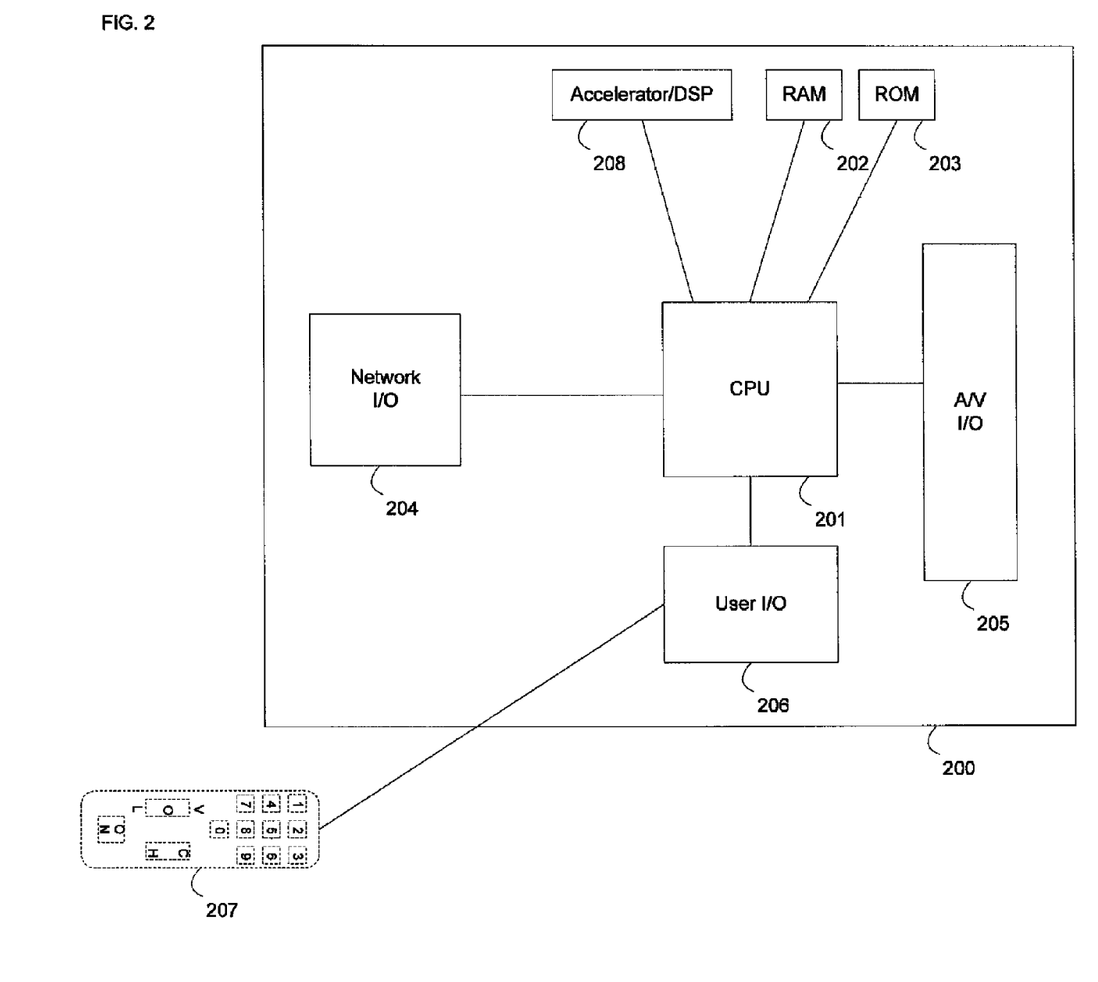
FIG. 2 is a block diagram illustrating an exemplary endpoint in accordance with the present invention.

As depicted in FIG. 2, a set-top-box (200) has a hardware architecture similar to a general purpose computer: a central processing unit (CPU) (201) executes instructions stored in Random Access Memory (RAM) (202) and/or read-only-memory (ROM) (203), and utilizes interface hardware to connect to the network interface (204), the audio/video output interface (205), and the user interface (206) (which is connected to a user input device (207), for example, a remote control). All these components are under the control of the CPU. A typical set-top-box also includes an accelerator unit (208) (for example, a dedicated Digital Signal Processor (DSP)) that helps the CPU (201) with computationally complex tasks, such as video decoding and video processing. An accelerator unit (208) is typically present for reasons of cost efficiency, rather than for technical necessity. That is, a much faster CPU can often substitute for accelerator or DSP, but those much faster CPUs (and their required infrastructure such as power supplies and faster memory) may be more expensive than dedicated accelerator units.

General purpose computers, such as Personal Computers (PCs), can often be configured to act like a set-top-box. In some cases, additional hardware can be added to the general purpose computer to provide the interfaces a typical set-top-box contains, and/or additional accelerator hardware can be added to augment the CPU for video decoding and processing.

The operating system controlling the set-top-box typically offers services that can be used (for example, receivers and transmitters according to certain protocols). The protocols of most interest here are those for the transmission of real-time application data: Internet Protocol (IP), User Datagram Protocol (UDP) and/or Transmission Control Protocol (TCP), and Real-time Transport Protocol (RTP). RTP receivers and transmitters can also be implemented in the application, rather than in the operating system. Most operating systems support the parallel or quasi-parallel use of more than one protocol receiver and/or transmitter.

The term "codec" is equally used to describe techniques for encoding and decoding and for implementations of these techniques. A (media) encoder converts input media data into a bitstream or a packet stream, and a (media) decoder converts an input bitstream or packet stream into a media representation suitable for presentation to a user (for example, digital or analog video for presentation on a video display, or digital or analog audio for presentation through loudspeakers. Encoders and decoders can be dedicated hardware devices or building blocks of a software-based implementation running on a general purpose CPU and/or an associated accelerator unit.

Set-top-boxes can be constructed such that many encoders or decoders run in parallel or quasi-parallel. For hardware encoders or decoders, one easy way to support multiple encoders/decoders is to integrate multiple instances in the set-top-box. For software implementations, similar mechanisms can be employed. For example, in a multi-process operating system, multiple instances of encoder/decoder code can be run quasi-simultaneously.

A basic approach to program navigation, i.e., successive channel skipping or "channel surfing," was suitable in the early days of broadcast TV systems, where there were only a few channels. As the number of broadcasting channels increased to many hundreds, successive channel skipping has become more cumbersome and time consuming. Although several proposed solutions, such as text-based electronic program guides, have been offered to alleviate this problem, they are not substitutes for the easy-to-use channel surfing experience of the older systems.

Increases in channel-change times have made channel surfing more difficult. Digital video codecs, alternatively known as digital video coding/decoding techniques (e.g., MPEG-2, H-series codecs such as H.263 and H.264), in conjunction with packet network delivery, have increased channel-change times to several hundred milliseconds or even seconds in many cases, for at least the following two reasons:

(1) Transport Delays: These delays result from buffering by the decoder at the receiving end, i.e., the endpoint, which is necessary to alleviate the effects of: (a) bandwidth changes in the transport network (such as variable link bandwidths experienced in wireless networks); (b) delay jitter caused by varying queuing delays in transport network switches; and/or (c) packet loss in the network.

(2) Encoding Delays: To display a video, the decoder at the endpoint, alternatively known as the receiver, receiver/receiving end, or receiver/receiving application, must receive an I-frame, alternatively known as an intra-coded frame, from the encoder before a video can be decoded. The temporal interval between I-frames in an encoder is in most prior art systems fixed (for example, 0.25 sec or more in most CATV systems) to reduce the required coding bandwidth. Therefore, when a user changes a channel, it can take as long as 0.5 seconds or more before the receiver can decode the video. Furthermore, it is well known that increasing the interval between I frames improves the coding efficiency. As a result, many IPTV service providers trade channel change times for better picture quality, with the result that channel change times of several seconds are not uncommon in deployed IPTV systems.

While CATV and satellite TV systems suffer only from encoding delays, IPTV and other packet network-based video distribution systems also suffer from transport delays, which can involve a significantly longer delay. In the evolving IPTV environment, the channel change time has become significantly longer, particularly when video channels are delivered over a best effort network such as the public Internet, where the network conditions are completely unpredictable.

In order to improve the channel surfing experience, significant changes are needed. In particular, an encoder is needed that: (a) generates a synchronization frame (i.e., the I-frame of the prior systems) only when needed (that is, not necessarily in a fixed time interval); (b) employs no or only a small number of future frames to minimize algorithmic delay; and (c) compensates for possible packet loss or insurmountable delay, rather than relying on receiving end buffering and error mitigation as the sole mechanism for error resilience. Because transport delays can cause significant impact to channel-change time, even a generic video teleconferencing codec (which normally implements all aforementioned features) cannot completely eliminate the delay problems.

Traditional video codecs, for example H.261 and H.263 (used for person-to-person communication purposes such as videoconferencing) or MPEG-1 and MPEG-2 Main Profile (used in Video CDs and DVDs, respectively), are designed with single layer coding, which provides a single bitstream. Depending on the application, that bitrate can be either fixed, or variable and dictated by the media content. That is, the more complex a scene becomes, the higher a bitrate is generated.

A limitation of single layer coding exists where, in the final rendering on the screen, a lower spatial resolution is required compared to the one typically utilized for full-screen video reproduction (such as in TV). The full resolution signal must be sent and decoded at the receiving end, but the spatial resolution needs to be reduced to fit the low required spatial resolution, thus wasting both bandwidth and computational resources. However, support for lower resolutions is essential in a channel surfing application displaying several channels simultaneously, as one goal is to fit as many channels displayed in mini browsing windows (MBWs) as possible into a specific screen area—which results in the MBWs being naturally of lower resolution than the main video program.

Layered video codecs, alternatively known as layered or scalable codecs/coding, are video compression techniques that have been developed explicitly for heterogeneous environments. In such codecs, two or more layers are generated for a given source video signal: a base layer and at least one enhancement layer. The base layer offers a basic representation of the source signal at a reduced quality, which can be achieved, for example, by reducing the Signal-to-Noise Ratio (SNR) through coarse quantization, using a reduced spatial and/or temporal resolution, or a combination of these techniques. The base layer can advantageously be transmitted using a reliable channel, i.e., a channel with guaranteed or enhanced quality of service (QoS). Each enhancement layer increases the quality by increasing the SNR, spatial resolution, or temporal resolution, and can often be transmitted with reduced QoS or best effort. In effect, a user is guaranteed to receive a signal with at least a minimum level of quality of the base layer signal.

SUMMARY

Disclosed are techniques including a method, apparatus, system, and computer-readable media containing instructions for processing a plurality of channels in a digital video distribution system (e.g., IPTV), which enables fast channel switching between channels. In U.S. provisional patent application Ser. No. 61/172,355, some of the techniques have been introduced as "side channel mode." An endpoint is configured to receive a first channel in layered bitstream format, including a base layer and optionally a plurality of enhancement layers. The base and optional enhancement layers of the first channel can be decoded and displayed in a main window of a video display. Further, the endpoint can be configured to receive at least one second channel in the form of a base layer. This second channel can also be decoded, and can be displayed in a Mini Browsing Window (MBW). Upon request by a user for a channel switch from the first channel to the second channel, in one exemplary embodiment, the decoding of the enhancement layer of the first channel terminates. In the same or another embodiment, the display of the first channel in the main window terminates. In the same or another embodiment, the decoded second channel is zoomed to fit the size of the main window, and can be displayed. In the same or another embodiment, the decoded base layer of the first channel may be displayed in a MBW. In the same or another embodiment, the server is instructed to stop sending enhancement layers of the first channel and/or commence sending at least one enhancement layer for the second channel.

An exemplary endpoint includes at least one receiver configured to receive channels coded in layered bitstream format, at least one decoder configured to decode channels coded in layered bitstream format, and a graphical user interface for receiving user input.

The accompanying drawings, which are incorporated and constitute part of this disclosure, illustrate exemplary embodiments of the disclosed invention and serve to explain the principles of the disclosed invention.

Throughout the drawings, the same reference numerals and characters, unless otherwise stated, are used to denote like features, elements, components or portions of the illustrated embodiments. Moreover, while the disclosed invention will now be described in detail with reference to the figures, it is done so in connection with the illustrative embodiments.

DETAILED DESCRIPTION

The present invention provides techniques for the distribution and display of video content, for example, live/on-air (e.g., TV channel), online, or pre-stored video files, in a way that provides for effective video content browsing, alternatively known as "channel surfing," and is well suited for any generic digital video distribution system, including those that use packet networks (e.g., IPTV) or public Internet (e.g., video services available on the Internet). A "channel" denotes not only live/on-air video content, but also any online or pre-stored video content. Channels may be represented by, for example, video signals, compressed video signals, or audio-visual signals. Specifically, the techniques provide for a digital video distribution system that allows for display of channels using a plurality of mini browsing windows, alternatively known as MBWs, of different sizes and numbers that simultaneously display several channels or video programs. The MBWs can be displayed independently or as an overlay on a main window, alternatively known as the full screen, which displays a single channel.

A rapid switching feature provides a user, alternatively known as a TV viewer, with the ability to browse a set of channels while watching one specific channel, and instantly switch to a different set of channels for browsing. Thus, the disclosed techniques provide a significantly enhanced channel surfing experience.

In order to achieve instant switching of channels displayed in MBWs, an exemplary digital video distribution system advantageously uses layered codec, for example, as described in co-pending U.S. patent application Ser. Nos. 12/015,956, 11/608,776, and 11/682,263 and U.S. Pat. No. 7,593,032. The present invention avoids the buffering and inherent encoding delays of a classical digital video distribution system, and permits fast switching of channels in MBWs.

In addition, the present invention improves bandwidth usage by generating multiple layers of video, i.e., the channels are coded in layered bitstream format, and uses only the lower layers to display channels in the MBWs. These lower layers represent lower resolutions, lower frame rate, or lower SNR, using much less bandwidth and enabling a low processing complexity. These techniques eliminate the need for receiver buffering by introducing slight performance degradation in the event of packet loss or excessive packet delay. Furthermore, layered codec provides rate matching to account for the fact that different channels may be using IP network connections with different bandwidths, which requires different data rates from the encoder.

Figure 3:
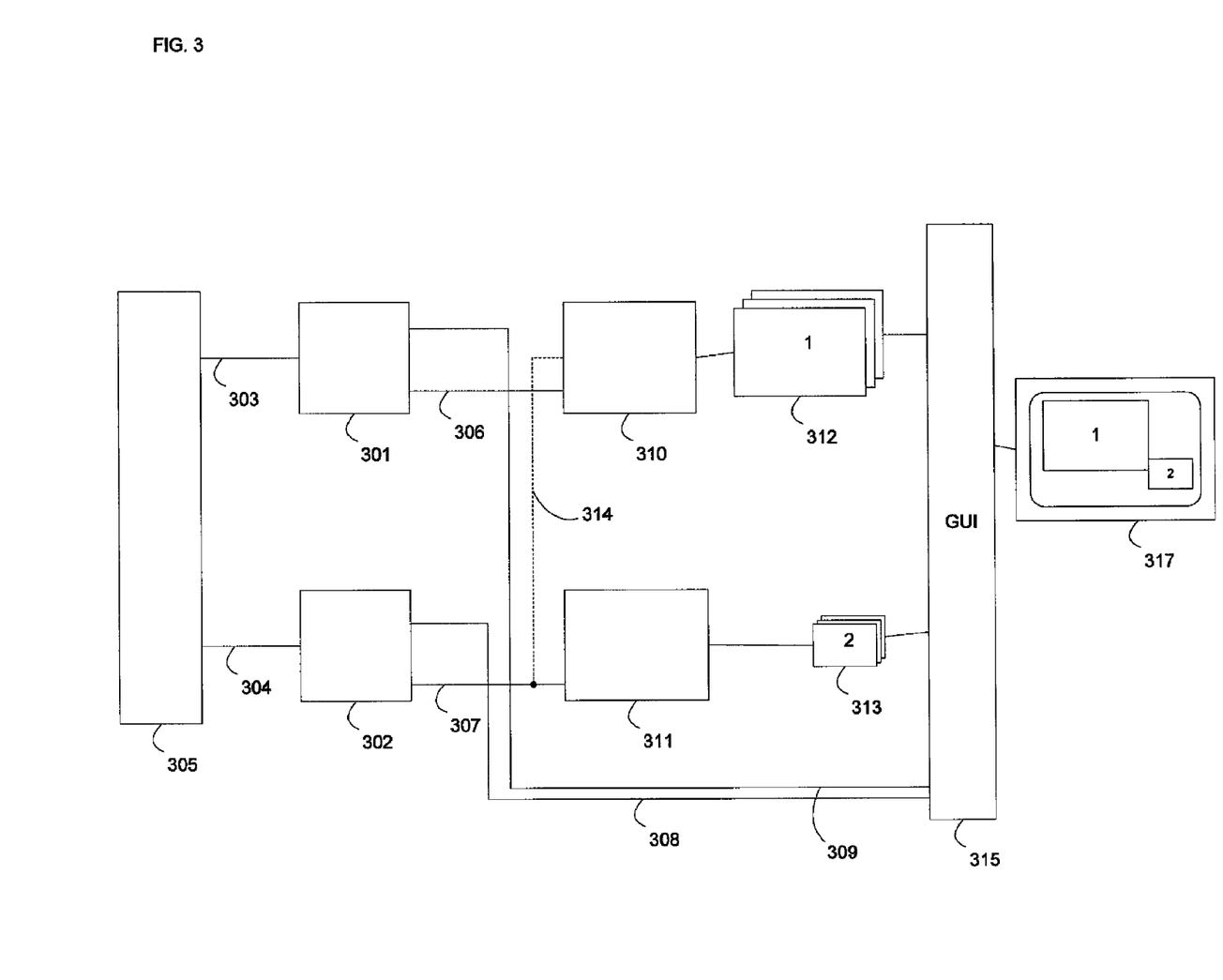
FIG. 3 is a block diagram illustrating an exemplary endpoint in accordance with the present invention.

FIG. 3 illustrates several components of an IPTV endpoint according to one embodiment of the present invention. Specifically, the endpoint includes more than one receiver (301, 302), each able to receive a channel in layered bitstream format, including at least a base layer, and possibly also one or more enhancement layers associated with the base layer. A receiver may also be configured to receive only an enhancement layer. Each receiver translates incoming packet data (303, 304) from the network interface (305), advantageously using the IP/UDP/RTP protocol hierarchy, into layered video bitstreams (306, 307) and side information (308, 309), such as timing information. Coupled to the receivers (301, 302) are decoders (310, 311) for layered video bitstreams. Each decoder translates the input layered bitstream (i.e., the base layer and one or more, if any, enhancement layers) into a sequence of video images (312, 313) for display. The aforementioned translation process may include operations not commonly associated with video decoding, such as: a) on the input side, dropping individual layers for a multi-layered bitstream; and b) on the output side, post processing, including post-filtering, temporal interpolation to increase the frame rate, and up- or down-zooming to a desired spatial output resolution. In the same or another embodiment, a given decoder can be coupled to more than one receiver (decoder 310 can be coupled to receiver 302 by connection 314) to receive, for example, a base layer from a first receiver and one or more enhancement layers from a second receiver.

In most cases, the receivers and decoders will be implemented in the form of independent processes running under a common operating system and on a given CPU, with the augmentation by accelerator units. However, they could also be implemented in other ways, including dedicated hardware implementations.

The sequences of video images (312, 313) are assembled by the means of a Graphical User Interface (GUI) (315) into a screen layout, taking into account the side information (308, 309), which is sent through a video output interface (316) to a TV screen (317).

Figure 4:
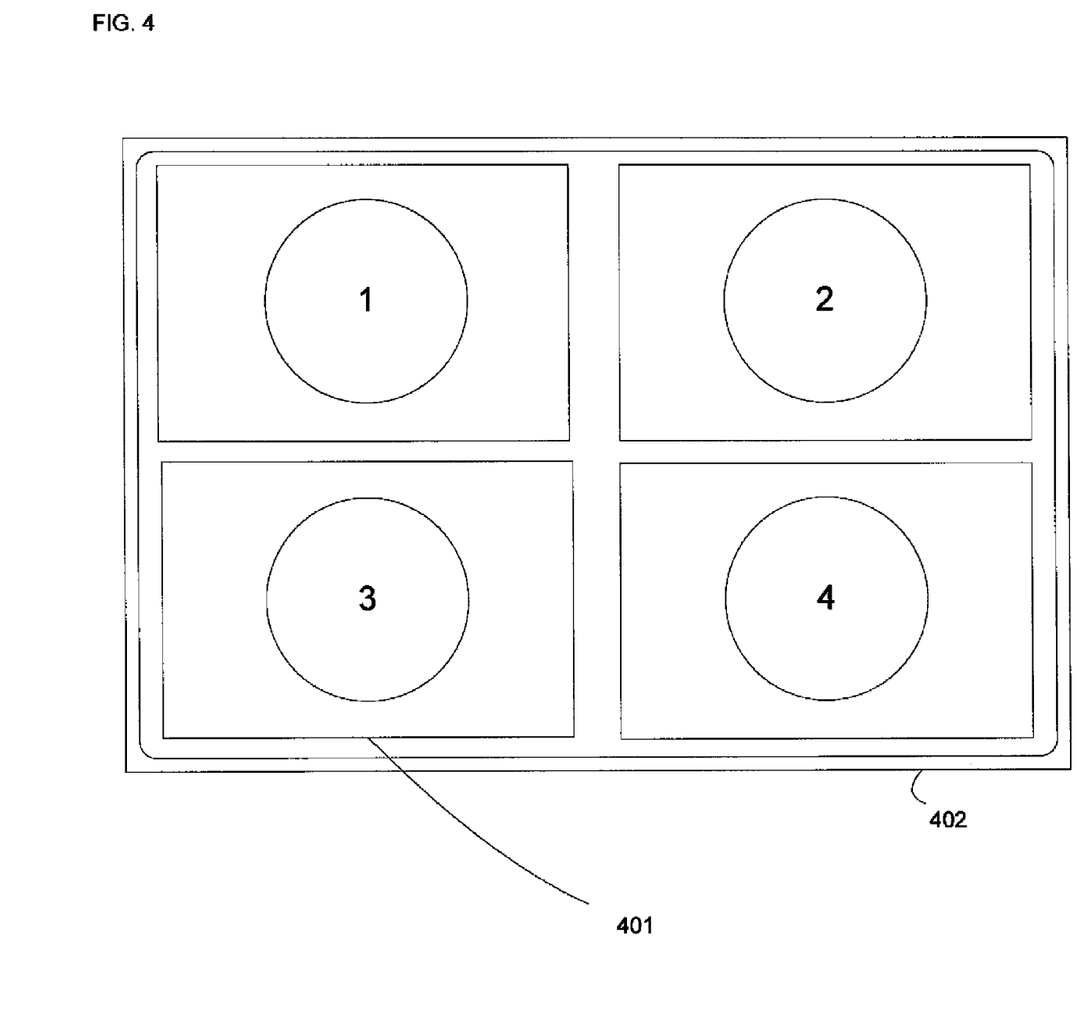
FIG. 4 is an exemplary video display screen in accordance with the present invention.

FIG. 4 depicts an exemplary screen layout where four MBWs (401) are depicted on a single TV screen (402). Conceptually, each of the MBWs presents to a user a motion video (e.g., a TV channel or stored video file). Returning to FIG. 3, to implement the screen layout with four MBWs as depicted in FIG. 4, at least four receivers (301, 302) are required, receiving at least four channels and at least four base layers. The receivers are coupled with at least four decoders (310, 311) to generate four sequences of video images (312, 313), which are assembled by the GUI (315) into a single screen layout, and displayed through the video output interface (316) to the TV screen (317).

Figure 5:
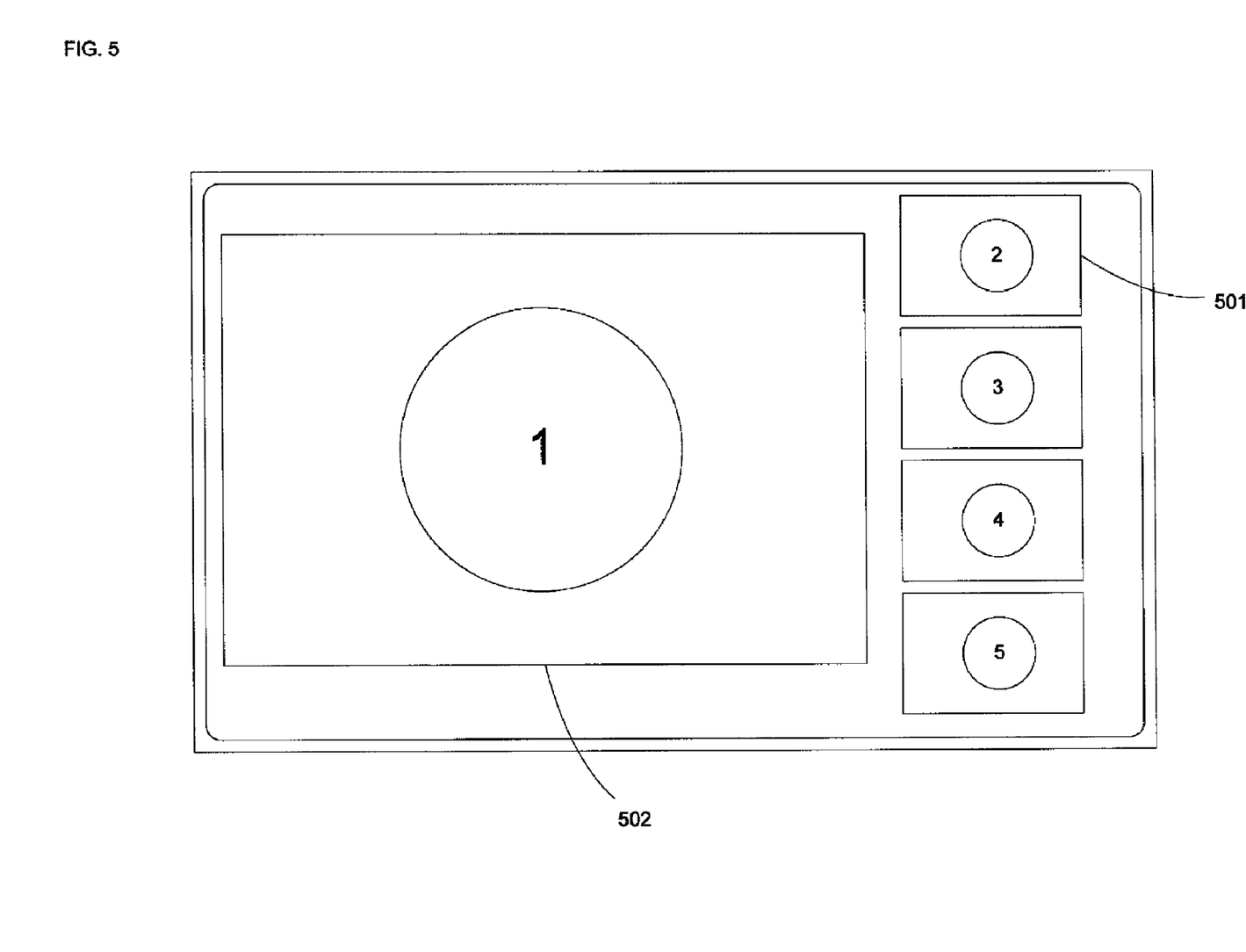
FIG. 5 is an exemplary video display screen in accordance with the present invention.

FIG. 5 depicts another exemplary screen layout where four MBWs (501) are in use, and overlap a main window (502). The main window displays a channel selected by the user. The MBWs display other channels which the user could easily select to view in the main window by using an input device to select or "click on" the MBW representing the desired channel.

In the same or another embodiment, the user can set MBW display configuration preferences through the GUI. The GUI is typically implemented as a software application similar to a Windows-based user interface. The user can control the GUI, for example, by using an input device, such as a TV remote control, computer mouse, keyboard, or other pointing device, and can select the number of MBWs (e.g., 2, 4 or more), the window size for each MBW (e.g., first MBW=QCIF, second MBW=QCIF, third MBW=CIF), or the location of the MBWs on the TV screen (e.g., align top, bottom, or side of the screen). The number of MBWs is only limited by the number of receivers and decoders. If decoders and/or receivers are implemented in hardware, then the number of MBWs is limited according to the number of available decoders and/or receivers. If decoders and receivers are implemented in software, then in most implementations, there is no practical limit in the number of MBWs except the performance of the CPU. Within the mentioned constraints in numbers and possibly constraints in the implementation of the GUI (potentially set by a service provider/operator to accommodate their business model), the user can fit as many MBWs as he/she desires so long as the total size of all MBWs does not exceed the available display size. There is no minimum limit for MBW size. The user can set the desired size on an MBW by dragging the edges of an MBW window, and/or by setting MBW display configuration preferences which specify size. Depending on the GUI, it may also be possible to have overlapping MBWs.

In the same or another embodiment, a channel selection mechanism henceforth called "side-channel mode" is implemented. Side-channel mode can advantageously be employed when the roundtrip network delay is so large that after the user's request, the delay in changing the displayed video is annoying or unacceptable to the user. Note that in this mode, the side channels (i.e., the next sequential channels to be displayed when a user is channel surfing) are sent even though the user is not necessarily actively surfing channels. In the side channel mode, the channel order becomes important.

There are two types of channel orders:
(1) Natural order: The order of the channels as defined by the video service provider; and
(2) User-selected order: The order of channels of interest to the user, which may be defined by the user through the GUI. In this scenario, the channel order can be completely different than that of natural order. There may be a much smaller set of channels of interest in the user-selected order.

So far, this disclosure has been concerned mostly with the endpoint and its operations. Now there is a need to at least briefly introduce the video server.

Figure 6:
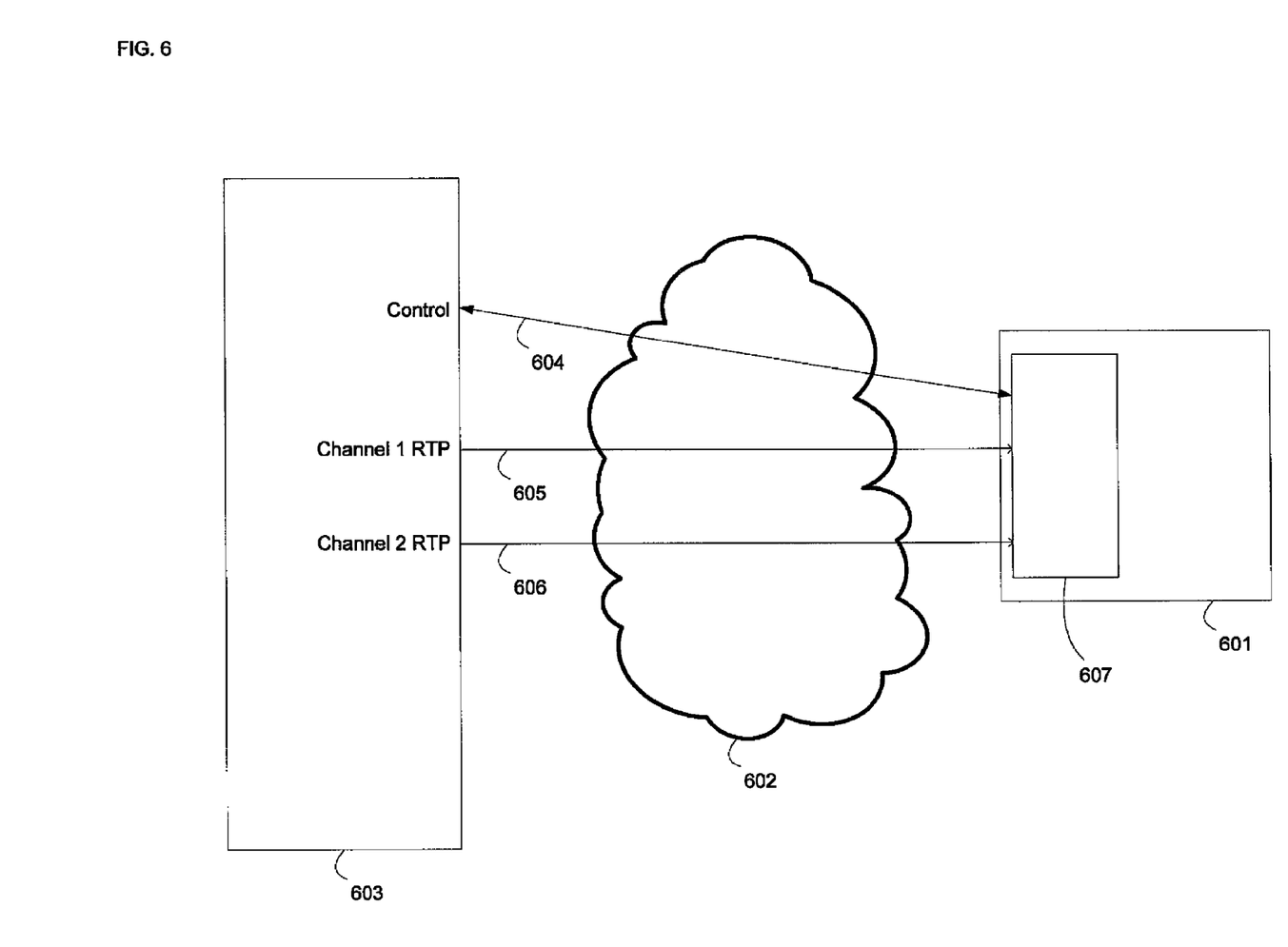
FIG. 6 is a block diagram illustrating an exemplary system for the distribution and display of audio-visual signals in accordance with the present invention.

Referring to FIG. 6, an endpoint (601) is connected through an IP network (602), for example the Internet, to at least one server (603), which is normally operated by a video service provider or operator. In side channel mode, typically, the following virtual connections exist between the server (603) and at least one endpoint (601): a) at least one control channel (604), which is typically bi-directional and runs application layer protocols such as SIP, RTSP, and/or similar protocols; b) for each channel that is being sent by the server (603), at least one RTP packet stream (605, 606), which is typically unidirectional and point-to-point. The RTP packet stream (605, 606) may be formed as an RTP session, or more than one RTP packet streams may be multiplexed into one or more RTP sessions using techniques such as SSRC multiplexing. An RTP session may have an associated RTCP bi-directional RTP control channel (not shown). All virtual channels terminate, in most practical cases, at the same network interface (607) of the endpoint (601). The server (603) is depicted here as one physical device, but can be distributed and/or decomposed. The details of the server architecture are not relevant for the invention presented.

As previously mentioned, most network interfaces relevant for IPTV systems have capacity limitations so that it is impractical to send more than the absolute minimum of channels to an endpoint. This is in contrast to CATV systems, where an endpoint, at least at the physical layer, receives in most cases all offered channels, and discards those that are not displayed. As the network interface capacity is limited, in an IPTV system, the server sends only those channel(s) that the endpoint is interested in receiving. In most current IPTV endpoints, the number of those channels is one; however, according to the invention presented, that number can be considerably higher and depends on factors such as the number of available and/or used receivers, decoders, MBWs, endpoint CPU load, endpoint connectivity, and so forth.

According to the invention, when in side channel mode, the server sends at least the "current channel" (i.e., the channel the user is most interested in, and which is typically displayed in the main window), and one side channel. In most cases, more than one side channel is sent.

Figure 7:
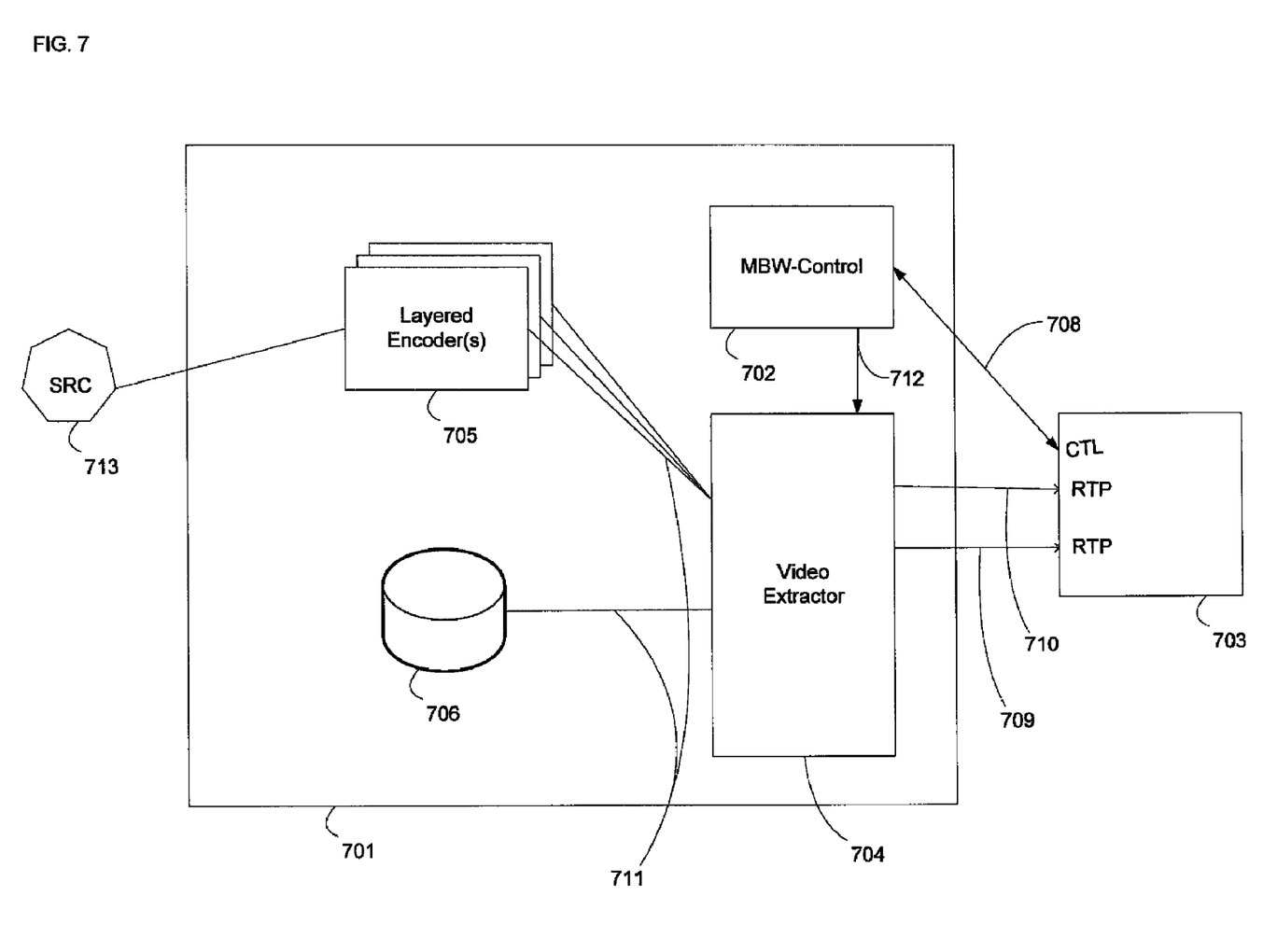
FIG. 7 is an exemplary server in accordance with the present invention.

FIG. 7 illustrates an exemplary video server (701) in accordance with the disclosed invention. The server may be distributed or centralized; for simplicity, a centralized server is shown. An exemplary video server (701) contains MBW control logic (702), which processes user control information (708) received from an endpoint (703), such as the desired number or size of the MBWs or the channels or other video content (e.g., pay-per-view or video-on-demand content stored in a video database) to be mapped to each MBW. The video server (701) can also contain one or more video extractors (704), which can extract base and/or enhancement layers from layered bitstreams (711) stemming from live/on-air video content from one or more layered encoders (705) or a video database (706).

The functionalities of a video extractor have been disclosed, for example, in co-pending U.S. patent application entitled "Systems, Methods and Computer Readable Media for Instant Multi-Channel Video Content Browsing in Digital Video Distribution Systems," filed herewith. In short, and only in the context of the invention presented, the main function of the video extractor is to receive a layered bitstream (711) and remove zero or more enhancement layers according to control information (712) received from the MBW control logic (702), create another layered bitstream (709, 710), which may contain fewer layers, and forward the layered bitstream (709, 710), typically as one or more RTP packet streams, to an endpoint (703). For example, assuming the user requested a certain TV channel in a small MBW, the channel would be available at the server (701) in the form of a layered bitstream (711), which contains a base layer and, for example, four enhancement layers, and the video extractor (704) would remove all the enhancement layers and create a layered bitstream (709) that contains only the base layer. Returning to FIG. 3, the newly created layered bitstream (303) represents one channel, and is sent through the network to the endpoint, wherein the layered bitstream (303) is typically fed by the network interface (305) into one receiver (301).

Referring again to FIG. 7, the layered encoder (705) takes input from a video source (713), such as a camera, a satellite downfeed, or similar video source, and converts it into a layered bitstream (711) comprising a base and zero or more enhancement layers.

The video database (706), which can be internal or external, contains at least one, but typically many, layered bitstreams (711) comprising a base layer and typically one or more enhancement layers. The storage format for the layered bitstream (711) may be conformant to one of the many file formats defined for stored video. Each of the layered bitstreams (711) may represent an episode of a TV show, a movie, or a similar content. When requested, the video database (706) forwards the selected layered bitstream (711) to the video extractor (704), possibly obeying timing rules (a process commonly known as "streaming"). It is equally possible, that the buffering and timing logic required for "streaming" is implemented in the video extractor (704), in which case the video database (706) makes the complete layered bitstream (711) available as a unit.

The details of the interworking between the video extractor (704), video database (706), and layered encoders (705) are not relevant for the invention presented, and, therefore, are not discussed further.

In the following paragraphs, disclosed is an exemplary embodiment of the digital video distribution system.

For this description it is assumed that the system is already up and running; that is, a user has authenticated himself/herself into the system (endpoint and, through the endpoint, server). Further, the system has brought up, as depicted in FIG. 5, one initial current channel ("channel 1") displayed in the main window (502) and secondary channels displayed in a plurality of MBWs, for example, four MBWs (501) ("channels 2, 3, 4 and 5"). Any other combination of zero or one main window, and a practically unlimited number of MBWs (within the constraints mentioned above) are also possible.

Returning to FIG. 3, as a result of this setup, the layered video bitstream (303) representing channel 1 displayed in the main window is received through the network interface (305) by a receiver (301), whereby a layered video bitstream (306) containing at least one enhancement layer, in conjunction with the base layer is forwarded to a decoder (310). The decoding process results in a sequence of video images (312) of high spatio-temporal resolution suitable for a pleasant viewing experience in the main window.

The secondary channels, channels 2, 3, 4 and 5 are handled by four receivers and four decoders, and result in four sequences of video images with a low spatio-temporal resolution, sufficient for the use in MBWs. FIG. 3 illustrates one of the four receive-decode chains, depicted by a second receiver (302) a second decoder (311) and a second decoded sequence of video images (313).

The GUI (315) assembles the sequences of video images (312, 313) into the screen layout illustrated in FIG. 5.

In this example, all five channels are served by the same server, as illustrated in FIG. 7. All five channels may, for example, have been originally stored in the video database (706) at a spatio-temporal resolution high enough for being displayed in the main window. The video extractor (704) is aware, by instructions received from the MBW control logic (702), that only the channel to be displayed in the main window is required at full resolution; all secondary channels are required only at MBW resolution. As a result, the video extractor (704) creates a layered bitstream (709) containing at least one enhancement layer for the channel to be displayed in the main window, and, in this example, base-layer only bitstreams for the four secondary channels (only one bitstream (710) is illustrated in FIG. 7). These are the five layered bitstreams (710) ultimately received at the endpoint (703).

Returning to FIG. 5, assume that the user has clicked on the topmost MBW (501), thereby selecting to view channel 2 in the main window instead of the current channel 1. This user activity invokes at least four activities in the endpoint, as illustrated by the flow chart in FIG. 8.

Figure 8:
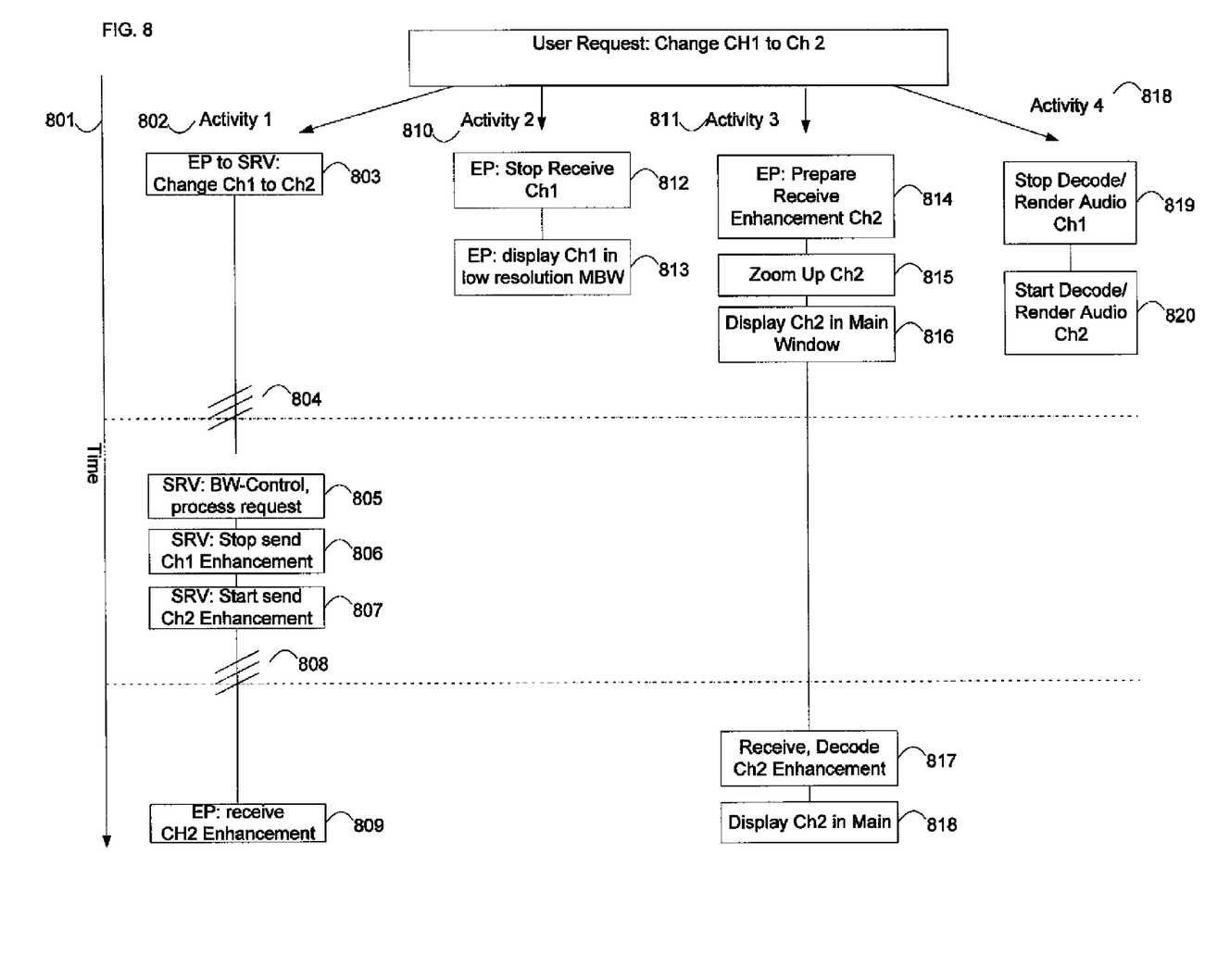
FIG. 8 is an exemplary message flow between an endpoint and a server in accordance with the present invention.

Vertical timeline (801) is not drawn to scale, as an event executed locally in server or endpoint are executed in the order of microseconds or milliseconds, whereas a one way transmission delay can be hundreds of milliseconds. FIG. 8 assumes a one way transmission delay of 300 milliseconds, and local execution at an endpoint lasting a user-imperceptible amount of time.

In a first activity (802), an endpoint sends (803) to the server information that the user has requested to change channels from, for example, channel 1 to channel 2. After the transmission delay (804), this information is processed (805) by the MBW control logic. As a result, the MBW control logic instructs the video extractor to a) stop (806) including those enhancement layers of the layered bitstream of channel 1 into the outgoing layered bitstream of channel 1 that are not required to achieve the spatial/temporal/quality resolution required for display of channel 1 in an MBW, and b) commence (807) including into the outgoing layered bitstream, for channel 2, enhancement layers required to achieve the spatio/temporal/quality resolution for display of channel 2 in the main window although sub-activities (806) and (807) are described and depicted to be executed sequentially, they can also occur in parallel, depending on the server implementation. The selection of the correct enhancement layers may be based on other factors such as the connectivity of the endpoint and server, screen size of the endpoint video display, size of the main window, and user preference on the spatial/temporal/quality tradeoff. After a one-way transmission delay (808), the endpoint receives (809), among others, packets that belong to the enhancement layers of channel 2 rather than channel 1.

The delay between the user request and the reception at the endpoint of the modified layered bitstreams, when taking the first activity in isolation, can be considerable and annoying. It is mostly the result of the two way transmission delay (804, 808) (which can be, for example, several hundreds of milliseconds, depending on the geospatial locations of server and endpoint), as well as on constraints in the video extractor. For example, simple video extractors may need to wait for an Intra frame before they can commence including enhancement layers representing a higher spatio-temporal resolution. This wait time is included in sub-activity (807).

The second (810) and third (811) activities mitigate this delay factor by briefly trading quality of the main window display for a fast visible reaction to user input. Both activities (810, 811) are executed locally in an endpoint and are, therefore, independent of any transmission delay.

In the second activity (810), the endpoint stops processing (812), i.e., receiving and decoding, the enhancement layers of channel 1 not required for display in a MBW. As a result, the sequence of video images switches—typically with a single picture's duration delay, for example $1/30^{th}$ of a second—from the high resolution previously used in the main window, to a resolution suitable for a MBW. Further, the GUI starts displaying (813) the newly created sequence of video images of channel 1 in the MBW that was previously displaying channel 2.

In the third activity (811), the endpoint prepares (814) to process the enhancement layers related to channel 2. That is, the receiver preparing the layered video bitstream for channel 2 is instructed not to discard any enhancement layers useful to achieve spatial/temporal/quality resolution required for display of channel 2 in the main window. However, until those enhancement layers are present in the layered bitstream received by the receiver preparing the layered video bitstream for channel 2, the receiver and its coupled decoder continue to decode the layered bitstream at the resolution required for display in a MBW. Until such time when enhancement layer information arrives (814), the decoder performs the additional function of "zooming up" (815) the picture of typically low spatial resolution sequence to a resolution suitable for display in the main window. The GUI takes this up-zoomed sequence of video images, and displays (816) it in the main window. After the duration of two transmission delays and the delay introduced by the video extractor, the enhancement information for channel 2 becomes available. At this point, the enhancement layer(s), together with the base layer are received, decoded, and displayed (817) in full resolution in the main window.

Finally, in the fourth activity (818), decoding and rendering of audio corresponding to channel 1 is stopped (819), and decoding and rendering of the audio corresponding to channel 2 commences (820). The audio component of all channels (displayed in either a MBW or in the main window) can always be sent from the server to the endpoint; this is possible as compressed audio takes only a fraction of the bandwidth of compressed video. However, alternatively, the server can also serve only the audio of the current channel, for example, the channel displayed in the main window. In this case, the bandwidth for the MBW-associated audio channels can be saved, but audio is not immediately available after a channel switch. Alternatively, it is also possible to carry different qualities of audio, for example, a low quality audio for channels displayed in the MBWs (using, for example a telephony-band speech codec at very low bitrate), and a high quality, possibly multi-channel audio for the channel displayed in the main window. In that case the user experience on the audio side would be comparable to the video user experience: immediately after the channel switch, low quality audio is audible, which is replaced by high quality audio after the channel switch delay (e.g., hundreds of milliseconds to a few seconds). Finally, assuming the use of a layered audio codec, an audio distribution mechanism similar to the one disclosed for video could be employed.

A number of further improvements are disclosed.

First, there are cases where it is both possible and reasonable to receive and decode channels for MBWs, but not display those MBWs. These non-displayed MBWs are henceforth called "virtual MBWs." In one embodiment, the decoded picture sequences of the virtual MBWs are available for immediate zooming up in the event that the user initiates a channel switch, allowing for fast channel switches, but still enable the use of the full video display screen for the current channel. In order to enable this embodiment in a meaningful way, the MBW control logic can typically assign channels to those virtual MBWs according to a strategy that reflects closely the user's typical surfing behavior, as discussed below.

Second, it has already been mentioned that many different mechanisms for the assignment of channels to receiver-decoder chains are possible. For example, an operator, or the user, may opt to make a fixed assignment between channel and receiver-decoder. In this case, very fast surfing between the channels with receiver-decoder assignment is possible, but changing to other channels would be time-consuming and annoying. However, depending on the number of available receivers and decoders in the endpoint (which, in the case of software implementations, can be virtually unlimited and depend mostly on available processing resources), and the available bandwidth between server and endpoint, it is conceivable that many receiver-decoder chains are active at the same time, probably serving the needs of most users. However, for more channel-hungry users, or (more likely) fewer available computational and/or bandwidth resources, the channel-to-receiver-decoder chain assignment can be dynamic to achieve the best possible user experience. One way to implement such dynamic assignment is as follows:

Channels are assigned to receiver-decoder chains in ascending or descending order according to the direction of the user's channel surfing behavior and in the natural or user-selected channel order. That means that, for example, whenever the user presses the channel-up button on the remote control and thereby selects the "next" channel, the server MBW control logic instructs the video extractor to stop sending the layered bitstream that represents the "lowest" channel that is being sent, and switch instead to sending the layered bitstream corresponding to the "next" channel in either natural or user-selected channel order. The result is a sliding window of available channels around the current channel, that is being updated every time a user hits channel-up or channel-down.

Other forms of assignment are also possible. For example, in the same or another embodiment, it is possible to automatically rotate the available channels in the available receiver-decoder chains for display in MBWs—as a result, the endpoint can display a fixed number of channels in MBWs for a fixed period of time, and then display the "next" set of channels in the MBWs, and so forth.

We claim:

1. A method for processing a plurality of channels in a digital video distribution endpoint, comprising:
   a. receiving at least one picture each of a plurality of channels, wherein the channels are coded in a layered bitstream format, including
      a base layer of a first channel,
      a base layer of at least one second channel, and
      a predetermined number of enhancement layers, if any, of the first channel;
   b. decoding the at least one picture of the base layer and the enhancement layers, if any, of the first channel;

c. displaying the decoded base layer and the enhancement layer, if any, of the first channel in a main window;

d. decoding the at least one picture of the base layer of at least one second channel in a mini browsing window (MBW);

e. displaying the at least one picture of the decoded base layer of the second channel in an enhancement layer;

f. receiving a user input requesting to switch from viewing the first channel in a main window to viewing a second channel in the main window;

g. displaying at least the base layer of the first channel in an MBW;

h. zooming, and displaying in a main window resolution, at least one decoded picture of the base layer of the second layer, at least until a first picture of an enhancement layer of the second layer has been decoded;

i. requesting at least one of an enhancement layers of the second channel be received and decoded;

j. receiving and decoding at least one picture of the at least one enhancement layer of the second channel; and k. displaying at least one picture of the at leas one enhancement layer of the second channel in the main window.

2. The method of claim 1, wherein at least one second channel is selected as an adjacent channel in a natural order to the first channel.

3. The method of claim 1, wherein at least one second channel is selected as an adjacent channel in a user defined order to the first channel.

4. Non-transitory computer readable media comprising a set of instructions to direct a processor to perform the steps recited in one or more of method claims 1, 2, and 3.

* * * * *